United States Patent
Gharda

(10) Patent No.: US 8,753,422 B2
(45) Date of Patent: Jun. 17, 2014

(54) APPARATUS FOR AND METHOD OF PRODUCTION OF IRON, SEMI STEEL AND REDUCING GASES

(76) Inventor: Keki Hormusji Gharda, Bandra (West) Mumbai (IN)

( * ) Notice: Subject to any disclaimer, the term of this patent is extended or adjusted under 35 U.S.C. 154(b) by 65 days.

(21) Appl. No.: 13/316,215

(22) Filed: Dec. 9, 2011

(65) Prior Publication Data

US 2012/0111149 A1    May 10, 2012

Related U.S. Application Data

(63) Continuation of application No. PCT/IN2010/000380, filed on Jun. 8, 2010.

(30) Foreign Application Priority Data

Jun. 10, 2009   (IN) .......................... 1399/MUM/2009

(51) Int. Cl.
| C21B 11/00 | (2006.01) |
| C21B 3/04 | (2006.01) |
| C21C 5/56 | (2006.01) |
| C10J 3/72 | (2006.01) |
| C10J 3/80 | (2006.01) |

(52) U.S. Cl.
USPC ................................ 75/489; 75/499; 75/505

(58) Field of Classification Search
CPC .............. C12B 3/00; C12B 5/00; C12B 9/00; C12B 11/00
USPC .................... 75/458–472, 488–499; 423/242.1–242.7

See application file for complete search history.

(56) References Cited

U.S. PATENT DOCUMENTS

| 2,837,419 | A | * | 6/1958 | Sellers et al. ................... 75/463 |
| 3,591,364 | A | * | 7/1971 | Reynolds et al. .............. 75/463 |
| 3,811,869 | A | * | 5/1974 | Ponghis et al. ................. 75/459 |
| 4,153,426 | A | | 5/1979 | Wintrell |
| 4,317,677 | A | | 3/1982 | Weber et al. |
| 4,504,043 | A | | 3/1985 | Yamaoka et al. |
| 4,725,381 | A | * | 2/1988 | Pinto ............................. 252/376 |
| 2010/0064855 | A1 | * | 3/2010 | Lanyi et al. .................... 75/458 |

FOREIGN PATENT DOCUMENTS

| CN | 1109910 A | | 10/1995 | |
| CN | 1152619 A | | 6/1997 | |
| GB | 1216779 | * | 7/1968 | ............... C21B 5/06 |
| WO | WO-2005/031009 A2 | | 4/2005 | |

OTHER PUBLICATIONS

International Search Report for PCT/IN2010/000380 (in English), mailed Dec. 2, 2010; ISA/CN.

* cited by examiner

*Primary Examiner* — Kaj K Olson
*Assistant Examiner* — Jared Wood
(74) *Attorney, Agent, or Firm* — Harness, Dickey & Pierce, P.L.C.

(57) ABSTRACT

A method is disclosed for producing cast iron or semi steel with reducing gas in a high pressure refractory lined shaft furnace using minimal or no coke Iron ore and slag are fed into the operative top zone of the shaft furnace while reducing gas which is generated in a refractory lined gasifier using preheated oxygen is fed through tuyeres at the operative bottom and middle zones. The shaft furnace is operated at a high pressure to increase productivity and to facilitate use of the spent reducing gas downstream. Excess oxygen is fed into the shaft furnace to reduce the carbon content in the molten iron and generate semi steel. The size of the furnace is reduced. The method is economical.

16 Claims, 1 Drawing Sheet

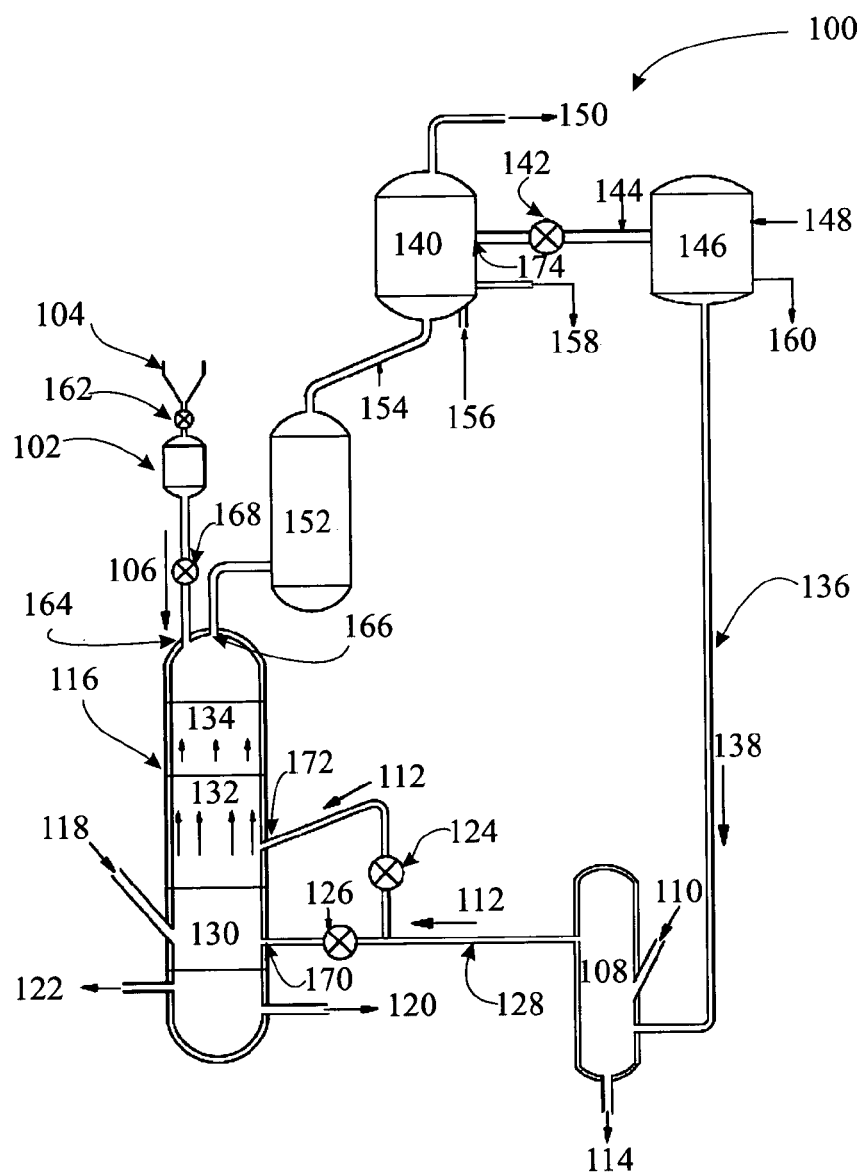

APPARATUS FOR AND METHOD OF PRODUCTION OF IRON, SEMI STEEL AND REDUCING GASES

CROSS-REFERENCE TO RELATED APPLICATIONS

This application is continuation of International application No. PCT/IN2010/000380, filed Jun. 8, 2010. This application claims priority to Indian Application No. 1399/MUM/2009, filed Jun. 10, 2009. The disclosure(s) of the above applications are incorporated herein by reference.

FIELD OF THE INVENTION

The present invention relates to a method and an apparatus for the production of molten iron and reducing gas in a high pressure shaft furnace.

BACKGROUND OF THE INVENTION & PRIOR ART

The melting of iron ore by a reducing gas generated in a furnace and the subsequent recovery of the reducing gas generally includes burning coke using hot air to generate a hot gas which is then passed upwardly through a coke-filled layer to melt iron retained therewith. The by-product gas or spent gas obtained in the process is a low-calorie gas rich in $N_2$ and $CO_2$. More recently, coal and hydrocarbon-based fuel is gasified in the presence of oxygen and steam to form a hot gas which is passed upwardly through a coal char fluidized bed to melt semi-reduced iron, the hot gas can be recovered. These processes have drawbacks like: the by-product gas obtained is a low-calorie gas rich in $N_2$ and $CO_2$, and cannot be used as a reducing or fuel gas; and the coal char fluidized bed is unstable and poor in the semi-reduced iron retaining power, thus, cannot bear the semi-reduced iron on the coal-char fluidized bed for a longer period of time and the iron must be melted in the possible shortest time with a large amount of the hot gas, which means that the thermal efficiency of melting is low.

Blast furnace process, on the other hand, is advantageous in that the gas reduction of iron ore proceeds in a stable manner, and the melt has a reduced content of iron oxides, thus posing little or no problems due to erosion of refractory materials in comparison with the melting/reducing processes. In addition, the blast furnace process exhibits a very high thermal efficiency due to the fact that the gas-reduction and melting of iron ore is carried out in the same vessel, and reduces the consumption of energy if the by-product gas is recovered for other purposes. However, the blast furnace process requires the use of coke of high quality, such as with high strength or low reactivity, so as to ensure good permeability in the furnace and stable descending of the stock therein. The production of these cokes inevitably needs a feed of coking coal of high quality and high energy for coking. The agglomerated iron ore used should also have a high strength and excel in the softening properties at high temperatures.

Therefore, there is felt a need for a process for producing cast iron with the productivity and thermal efficiency similar to a blast furnace process as well as with the possibilities of applying cheaper raw materials. Some of the related prior art is listed in the following discussion.

The prior art of producing molten iron and reducing gas includes following: 1. Process of Sumitomo Metal Industries Ltd, Japan (U.S. Pat. No. 4,504,043) In a melting/gasifying furnace including a coke filled layer, coal is gasified by oxygen blown through tuyeres into a hot reducing gas which is caused to ascend through the coke filled layer so as to melt the reduced iron supported on the top of the coke filled layer. The resulting molten iron flows down through the coke filled layer and is collected in the lowermost region of the coke filled layer and discharged therefrom while the hot gas is recovered. The thus recovered gas is fed into a shaft reduction furnace to reduce the iron ores and the thus formed reduced iron is supplied into the melting/gasifying furnace. In addition to the coal a variety of fuels mainly comprising carbon and hydrogen such as heavy oil, natural gas etc. are used for gasification. The fuel is blown through the tuyeres and/or charged through middle openings disposed above the tuyeres.

2. Process of synthesis gas production using blast furnace as gasifier by Arthur G. McKee & Company, Ohio (U.S. Pat. No. 4,153,426) The furnace is charged in a conventional manner with particles of solid carbonaceous material such as normal, low grade or undersized coke together with slag-producing material, such as limestone, silica and/or basic oxygen furnace and/or open hearth furnace slag. Fluent fuel such as pulverized coal mixed with oxygen-containing gas and with lime if desired is injected into pre-ignition chambers near the hearth line of the furnace. The fluent fuel is ignited and partially gasified in the pre-ignition chambers, creating a hot reducing gas that enters the furnace raceway and passes upwardly into and through the body of charge material in the furnace stack. At the resulting high temperatures, ash from the fluent fuel liquefies within the system to provide a liquid slag. Under a controlled high temperature reducing atmosphere, the hot lime removes essentially all sulfur from the product gas. To reduce the high gas temperature, steam is injected above the pre-ignition chambers. The steam reacts with the hot solid carbonaceous material in the stack to enrich the product gas with additional hydrogen and carbon monoxide. Liquid carbonaceous material such as oil, tar, or the like may be injected into the furnace stack above the location at which steam is injected and is cracked by the sensible heat of the gas passing through the body of charge material in the furnace, thus further cooling the gas and enriching its calorific value.

The resulting product gas can be used in place of natural gas for heating purposes in steel making operations, as a gas in the production of chemicals, as a reducing gas for the metals industries, for general heating purposes, as well as for other purposes.

3. Process for producing liquid crude iron and reducing gas by Korf-Stahl AG. (U.S. Pat. No. 4,317,677)

A process for the production of molten crude iron and reduction gas is described wherein the molten iron and gas are formed in a smelting gasifier, to which is introduced at the upper portion thereof preheated sponge iron of particle size between 3 mm and 30 mm and coal to form a fluidized bed, and an oxygen-containing gas at the lower portion thereof, and controlling the ratio of oxygen-containing gas and coal to maintain a high temperature zone in the lower portion of the gasifier and a lower temperature zone in the upper portion thereof, the oxygen containing gas being introduced substantially immediately above the resulting melt which is formed at the bottom of the gasifier.

4. U.S. Patent application No. 20100064855 of Lanyi et al. teaches a method for manufacturing of steel by employing an integrated system for blast furnace iron making and power production based upon higher levels of, oxygen enrichment in the blast gas. The integrated system leads to; 1) enhanced productivity in the blast furnace, 2) more efficient power production, and 3) the potential to more economically capture and sequester carbon dioxide. Oxygen enhances the ability of coal to function as a source of carbon and to be gasified within the blast furnace thereby generating an improved fuel-containing top gas.

OBJECT OF THE INVENTION

An object of the present invention is to provide an apparatus to produce cast iron or semi steel and reducing gas in a shaft furnace and a method thereof.

Another object of the present invention is to provide an economical method for producing cast iron or semi steel and reducing gas.

Yet another object of the present invention is to use a compact furnace for producing the cast iron or semi steel.

Still another object of the present invention is to replace coke with coal having a high ash content to provide optimum efficiency.

One more object of the present invention is to provide a method for producing spent reducing gases which are reused downstream.

Yet one more object of the present invention is to provide a substantial reduction in the size of the furnace and the volumetric flow rates per ton of molten iron.

Still one more object of the present invention is to easily vary the ratio of the quantity of iron and reducing gas generated, as per the requirements.

An additional object of the present invention is to provide semi steel by reducing the carbon content of the molten iron.

Still additional object of the present invention is to feed powdered low ash coal to the furnace to further reduce the size of the furnace.

SUMMARY OF THE INVENTION

In accordance with the present invention, there is disclosed a process for providing cast iron or semi steel by using a high pressure refractory lined shaft furnace having operative top, bottom, and middle zones, operating at a pressure between 5 and 50 kg/cm$^2$g, said process comprising:
(i) feeding iron ore from an inlet provided in the operative top zone along with slag producing material like limestone;
(ii) gasifying a carbonaceous material in a separate refractory lined gasifier, operated at a pressure between 5 and 50 bar, using preheated oxygen, to provide reducing gas at a temperature of at least 1400° C.; (iii) feeding in parts the reducing gas through tuyeres provided at the operative bottom zone;
(iv) smelting the iron ore and slag material by using the reducing gas in the high pressure shaft furnace, to provide molten iron and molten slag; (v) controlling and maintaining the temperature to between 1400 and 1700° C., required for iron ore reduction and melting in the operative bottom zone of the high pressure shaft furnace during the operation; (vi) collecting molten iron and molten slag in the operative bottom zone; (vii) discharging molten iron and molten slag from the operative bottom zone; and (viii) discharging spent reducing gas from the operative top zone.

Typically, in accordance with the present invention, the process includes the step of injecting preheated steam and/or carbon dioxide in the refractory lined gasifier in addition to the preheated oxygen and coal for controlling the reducing gas temperature.

Typically, in accordance with the present invention, the process includes the step of injecting steam and/or carbon dioxide through tuyeres provided at the operative bottom zone and the operative middle zone of the high pressure shaft furnace, in addition to the reducing gas and oxygen, for maintaining the required temperature profile in the high pressure shaft furnace.

Alternatively, in accordance with the present invention, the process includes the step of feeding reducing gas through tuyeres provided at the operative bottom zone and the operative middle zone.

Additionally, in accordance with the present invention, the process includes the step of feeding additional oxygen along with reducing gas through tuyeres provided at the operative bottom zone and the operative middle zone.

Preferably, in accordance with the present invention, the process includes the step of reductive melting of the iron ore and slag material in the operative middle zone and the operative bottom zone of the high pressure shaft furnace.

Preferably, in accordance with the present invention, the iron ore used is in the form of pellets or lumps.

Typically, in accordance with the present invention, the process includes the step of gasifying at least one carbonaceous material selected from the group consisting of coal having an ash content of about 5-40%, tar, heavy residue oil, biomass, and natural gas.

Preferably, in accordance with the present invention, the process includes the step of purifying the spent reducing gas to extract dust and sulfur.

Additionally, in accordance with the present invention, the process includes the step of passing the purified spent reducing gas through a shift catalyst in the presence of steam to provide a hydrogen-rich reusable reducing gas comprising $H_2$, CO, $CO_2$ and $N_2$.

Typically, in accordance with the present invention, the process includes the step of using the hydrogen-rich reusable reducing gas in the downstream for synthesis of ammonia, methanol, and urea, as a general purpose fuel, or for preheating oxygen, steam, and carbon dioxide.

Preferably, in accordance with the present invention, the shift catalyst is selected from the group consisting of copper, platinum, zinc, aluminum, iron, and chromium.

In accordance with the present invention, the ratio of iron production to spent reducing gas varies between 0.1 and 2 by mass.

In accordance with the present invention, the output per unit volume of the high pressure shaft furnace is 5-25 times of the output of a conventional blast furnace.

Additionally, in accordance with the present invention, the process includes the step of feeding excess oxygen through the tuyere at the operative bottom zone of the high pressure shaft furnace to produce semi steel.

Additionally, in accordance with the present invention, the process includes the step of feeding powdered low ash coal through tuyeres provided at the operative bottom zone and the operative middle zone of the high pressure shaft furnace in addition to the reducing gas and oxygen.

Alternatively, in accordance with the present invention, the process includes the step of separating coal ash slag along with the iron ore slag from the operative bottom zone of the high pressure shaft furnace.

Typically, in accordance with the present invention, the process includes the step of discharging molten iron and molten slag into a pressurized container and subsequently de-pressurizing the container for discharging molten iron and slag into troughs.

Alternatively, in accordance with the present invention, the process includes the step of separately discharging molten iron and slag into pressurized containers and subsequently de-pressurizing the containers for discharging molten iron and slag into troughs.

BRIEF DESCRIPTION OF THE ACCOMPANYING DRAWING

The invention will now be described with reference to the accompanying drawing, in which;

FIG. 1 illustrates the schematic of the preferred embodiment of the apparatus for producing cast iron or semi steel and reducing gas, in accordance to the present invention.

DETAILED DESCRIPTION OF THE ACCOMPANYING DRAWING

The invention will now be described with reference to the accompanying drawing which does not limit the scope and ambit of the invention. The description provided is purely by way of example and illustration.

The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present invention, the preferred, systems and methods are now described.

The present invention envisages an apparatus and a method thereof for producing cast iron or semi steel and reducing gas in a high pressure refractory lined shaft furnace. In accordance with the present invention, coal having up to 40% ash content is used, wherein the coal is gasified in the presence of preheated oxygen and steam and/or recycled carbon dioxide to generate hot gases having temperature between 1400-1700° C., the hot gases are used for reductive melting of iron ore in the refractory lined shaft furnace operated at a pressure between 5 and 50 $kg/cm^2g$; producing molten iron or semi steel and spent reducing gases. The spent reducing gases generated during the process are received in a composition adjustment reactor where using a shift catalyst the hydrogen content of the spent reducing gas is increased, making the spent reducing gas suitably reusable downstream.

FIG. 1 discloses a schematic of the apparatus and method thereof for producing cast iron or semi steel and reducing gas, in accordance with the preferred embodiment of the present invention, referred in FIG. 1 by numeral 100. The apparatus 100 comprises a high pressure refractory lined shaft furnace 116 similar in construction to a blast furnace or a pressure slagging coal gasifier. The high pressure shaft furnace 116 is divided into three zones, viz., an operative top zone 134, an operative bottom zone 130, and an operative middle zone 132. Iron ore, typically in the form of pellets or lumps, and a slag material such as limestone, is fed through a hopper 104 by using a regulator 162 in a controlled manner for storage in a charging device 102. The charging device 102 is operative connected to a regulator 168 which regulates the flow of the iron ore and slag material into the high pressure shaft furnace 116. The iron ore is fed through an opening 164 in the operative top zone 134 of the shaft furnace 116 along with the necessary amount of slag producing materials like limestone either separately or incorporated into the iron ore. The flow direction of the iron ore and slag material is shown in FIG. 1 by direction arrow 106.

Operating pressure of the shaft furnace 116 can be varied between 5 $kg/cm^2g$ to 50 $kg/cm^2g$, however an operating pressure of 20-30 $kg/cm^2g$ is preferred. At least one carbonaceous material selected from coal having an ash content of up to 40%, tar, heavy residue oil, biomass and natural gas; is gasified in a separate refractory lined gasifier, referred in FIG. 1 by numeral 108, operated at a pressure between 5-50 bar, the carbonaceous material being fed through an inlet 110; gasification performed in the presence of preheated oxygen received therein through the conduit means 136, flow direction shown by arrow 138, to provide hot reducing gas having temperature between 1400-1700° C. Steam or carbon dioxide (recovered from the shaft furnace vent gases) is injected along with oxygen to control the temperature of the reducing gas. The slag produced during the gasification process is discharged from an outlet 114 provided in the gasifier 108. The hot reducing gas is received in shaft furnace 116 through the conduit means 128, flow direction represented by arrow 112. In the gasification process, steam or recycled carbon dioxide can be optionally added for controlling the reducing gas temperature. Slag producing materials like limestone are also added with coal to remove the coal ash as molten slag from the gasifier 108. Coal with higher ash content (up to 40% or even higher) can thus be used without having any effect on the shaft furnace operations.

The reducing gas thus generated has a temperature of at least 1400° C. and is supplied in parts to the shaft furnace 116 for reductive melting of the iron ore and slag material, at tuyeres 170 and 172 provided at the operative bottom zone 130 and the operative middle zone 132, respectively. The flow rate of the hot reducing gas fed to the shaft furnace 116 is regulated by regulators 126 and 124 provided along the conduit means 128. The flow rate of the hot reducing gas is controlled using the flow regulators 124 and 126, depending upon the desired ratio of the quantity of iron to spent reducing gas. Steam, carbon dioxide or oxygen can be injected through a tuyere 118 in addition to the reducing gas for maintaining desired temperature in the shaft furnace 116. Optionally, powdered low ash coal can be added through the tuyere 118 in the operative bottom zone 130 to control the shaft furnace 116 temperature.

Part of the hot reducing gas is fed with the oxygen, if necessary, through the tuyere 170 at the operative bottom zone 130 of the shaft furnace 116. Excess oxygen is fed through the tuyere 118 at the operative bottom zone 130 when producing semi steel. The hot reducing atmosphere thus created provides adequate heat for melting of the reduced iron as well as slag. The hot reducing atmosphere also results in reduction in the quantity of carbon in the molten iron and the hence the production of semi steel. Additional oxygen, if necessary and the balance reducing gas are fed in the operative middle zone 132 through the tuyere 172, to provide heat as well as the reductant for the iron ore conversion. The iron ore and slag material get heated by the rising reducing gases in the operative top zone 134. In the operative middle zone 132 iron ore gets reduced. The reduced iron finally melts in the operative bottom zone 130 and the operative middle zone 132 and is tapped off from an outlet 120 provided in the shaft furnace 116. Molten slag is also produced during the process in the operative bottom zone 130 which is separately tapped off from an outlet 122 provided in the shaft furnace 116. Optionally, the molten slag can be tapped off collectively with the molten iron. The output per unit volume of the high pressure shaft furnace 116 in accordance to the present invention is 15-25 times that of a conventional blast furnace. The molten iron and the molten slag are discharged into pressurized containers (not shown in the figure) from the operative bottom zone 130, separately or collectively, and subsequently tapped off. These pressurized containers containing the molten iron and molten slag are de-pressurized subsequently to discharge the iron and slag into separate troughs (not shown in figures).

Quantity of the reducing gas fed through tuyeres 170 and 172 is increased as per the requirement of the spent reducing gas for the downstream processes. Thus, the ratio of the quantity of iron to spent reducing gas produced can be varied between 0.1 and 2 by mass. The spent reducing gas is discharged from the operative top zone 134 of the shaft furnace 116 through a vent 166. The spent reducing gas leaving the shaft furnace 116 is purified by passing through a gas cleansing unit 152 comprising a cyclone separator (not shown in figure) and a scrubber (not shown in figure) to remove the dust and the sulfur. Further, the spent reducing gas from the gas cleaning unit 152 is received in the composition adjustment reactor 140 through the conduit means 154; wherein the spent reducing gas is passed through a shift catalyst selected from copper, platinum, zinc, aluminum, iron, and chromium, in the presence of steam entering the reactor 140 at an inlet 156, to adjust the hydrogen content as per the requirement of the downstream process as known in the art, to provide a hydrogen-rich reusable reducing gas comprising of $H_2$, CO, $CO_2$, and N2. The by-products are discharged through an outlet 158 in the reactor 140.

The hydrogen-rich reusable reducing gas exiting the reactor 140 at a first outlet 150 is used downstream for the synthesis of ammonia, methanol, acetic acid, and urea; is used as a general fuel; or is used for preheating the feed oxygen, steam and carbon dioxide. A portion of the hydrogen-rich reusable reducing gas, discharged through a second outlet 174 of the reactor 140, is used for preheating oxygen, steam, or carbon dioxide used in the process. The flow rate of the hydrogen-rich reusable reducing gas is controlled by a regulator 142 provided on a conduit means 144 operatively connecting the reactor 140 to a preheater 146. In the preheater 146, which is preferably a coal and/or reducing gas fired tubular furnace, the feed oxygen, steam or carbon dioxide entering through an inlet 148 of the preheater 146, is preheated up to 750° C. The reducing gas after being extracted off heat is discharged from the preheater 146 through an outlet 160.

EXAMPLES

It is known that, in a typical Blast Furnace, apart from iron ore, 30 to 80 kg Coal, 400-510 Kg Coke, 1300-1400 Kg Air, 50-110 Kg of Oxygen are used to produce one MT iron in the molten form.

Compared to this, we have invented a process for producing cast iron or semi steel and a hydrogen-rich reusable reducing gas having three alternative compositions merely as examples but not restricted to, for Ammonia, Methanol or Acetic Acid as follows:

In one case of the invented method where the hydrogen-rich reusable reducing gas is to be used for Ammonia synthesis; 900-1200 kg high ash Coal, 80-120 Kg coke, 600-800 Kg Air, 600-800 Kg Oxygen and 500-690 kg steam are used in the high pressure shaft furnace to produce one MT iron in the molten form, along with the hydrogen-rich reusable reducing gas suitable for synthesis of 500-700 Kg of NH3.

In another case of the invented method where the hydrogen-rich reusable reducing gas is to be used for the synthesis of Methanol; 800-1000 kg high ash Coal, 80-120 Kg coke, 1000-1250 Kg Oxygen and 500-600 kg steam are used in the high pressure shaft furnace to produce one MT iron in the molten form, along with the hydrogen-rich reusable reducing gas suitable for synthesis of 650-850 Kg of Methanol.

In yet another case of the invented method where the hydrogen-rich reusable reducing gas is to be used for Acetic Acid synthesis; 800-930 kg Coal, 100-120 Kg coke, 1360-1430 Kg Oxygen and 200-350 kg steam are used in the high pressure shaft furnace to produce one MT iron in the molten form, along with the hydrogen-rich reusable reducing gas suitable for synthesis of 800-1000 Kg of Acetic acid.

In the above stated examples, when using the present invention, the iron or steel production is enhanced by 15-25 times compared to the conventional blast furnace because of the operation of reduction process under 25 Kg/cm2 pressure and absence of nitrogen.

Technical Advancements

An apparatus and a method thereof for providing cast iron or semi steel and reducing gas by using a high pressure shaft furnace, in accordance with the present invention has several technical advantages including but not limited to the realization of: providing an economical method for producing cast iron or semi steel and reducing gas;

- using a compact furnace for providing the cast iron or semi steel;
- replacing most or all of the coke with coal having a high ash content to provide optimum efficiency;
- providing a method for producing spent reducing gases which are reused downstream;
- providing a substantial reduction in the size of the furnace and the volumetric flow rates per ton of molten iron;
- varying easily the ratio of the quantity of iron and reducing gas generated, as per the requirements;
- providing semi steel by reducing the carbon content of the molten iron; and
- feeding powdered low ash coal to the furnace to further reduce the size of the furnace.

The numerical values mentioned for the various physical parameters, dimensions or quantities are only approximations and it is envisaged that the values higher/lower than the numerical values assigned to the parameters, dimensions or quantities fall within the scope of the invention, unless there is a statement in the specification specific to the contrary.

In view of the wide variety of embodiments to which the principles of the present invention can be applied, it should be understood that the illustrated embodiments are exemplary only. While considerable emphasis has been placed herein on the particular features of this invention, it will be appreciated that various modifications can be made, and that many changes can be made in the preferred embodiments without departing from the principle of the invention. These and other modifications in the nature of the invention or the preferred embodiments will be apparent to those skilled in the art from the disclosure herein, whereby it is to be distinctly understood that the foregoing descriptive matter is to be interpreted merely as illustrative of the invention and not as a limitation.

What is claimed is:

1. A process for providing cast iron or semi steel and hydrogen-rich reusable reducing gas by using a high pressure refractory lined shaft furnace having operative top, bottom, and middle zones, operating at a pressure between 5 and 50 kg/cm$^2$g, the process comprising:
    (i) feeding iron ore from an inlet provided in the operative top zone along with a slag producing material;
    (ii) gasifying a carbonaceous material in a separate refractory lined gasifier, operated at a pressure between 5 and 50 bar, using preheated oxygen, to provide reducing gas at a temperature of at least 1400° C.;
    (iii) feeding in parts the reducing gas to the high pressure shaft furnace through tuyeres provided at the operative bottom zone;

(iv) smelting the iron ore and slag material by using the reducing gas in the high pressure shaft furnace, to provide molten iron and molten slag;

(v) controlling and maintaining the temperature to between 1400 and 1700° C., required for iron ore reduction and melting in the operative bottom zone of the high pressure shaft furnace during the operation;

(vi) collecting molten iron and molten slag in the operative bottom zone;

(vii) discharging molten iron and molten slag from the operative bottom zone;

(viii) discharging spent reducing gas from the operative top zone into a gas cleansing unit;

(ix) extracting dust and sulfur from the spent reducing gas in the gas cleansing unit, to provide a purified spent reducing gas; and (x) passing the purified spent reducing gas through a shift catalyst selected from the group consisting of copper, platinum, zinc, aluminum, iron and chromium in the presence of steam to provide the hydrogen-rich reusable reducing gas, wherein excess oxygen is fed through the tuyeres at the operative bottom zone of the high pressure shaft furnace to produce semi steel.

2. The process as claimed in claim 1, further comprising a step of injecting at least one of steam and carbon dioxide in the refractory lined gasifier in addition to the preheated oxygen for controlling the reducing gas temperature.

3. The process as claimed in claim 1, further comprising a step of injecting at least one of steam and carbon dioxide through tuyeres provided at the operative bottom zone and the operative middle zone of the high pressure shaft furnace to maintain the required temperature profile in the high pressure shaft furnace.

4. The process as claimed in claim 1, further comprising a step of feeding reducing gas through tuyeres provided at the operative bottom zone and the operative middle zone.

5. The process as claimed in claim 1, further comprising a step of feeding additional oxygen along with reducing gas through tuyeres provided at the operative bottom zone and the operative middle zone.

6. The process as claimed in claim 1, further comprising a step of melting the iron ore and slag material in the operative middle zone and the operative bottom zone of the high pressure shaft furnace.

7. The process as claimed in claim 1, wherein the iron ore is in the form of pellets or lumps.

8. The process as claimed in claim 1, further comprising a step of gasifying at least one carbonaceous material selected from the group consisting of coal having an ash content of up to 40%, tar, heavy residue oil, biomass, and natural gas.

9. The process as claimed in claim 1, wherein the reusable gas is used for preheating the oxygen used in step (ii).

10. The process as claimed in claim 1, wherein the ratio of iron production to spent reducing gas varies between 0.1 and 2 by mass.

11. The process as claimed in claim 1, further comprising a step of feeding powdered low ash coal through tuyeres provided at the operative bottom zone and the operative middle zone of the high pressure shaft furnace.

12. The process as claimed in claim 1, further comprising a step of separating coal ash slag along with the iron ore slag from the operative bottom zone of the high pressure shaft furnace.

13. The process as claimed in claim 1, further comprising a step of discharging molten iron and molten slag into a pressurized container and subsequently de-pressurizing the container for discharging molten iron and slag into troughs.

14. The process as claimed in claim 1, further comprising a step of separately discharging molten iron and slag into pressurized containers and subsequently de-pressurizing the containers for discharging molten iron and slag into troughs.

15. The process as claimed in claim 1, wherein the reusable reducing gas is used downstream for the synthesis of ammonia, methanol, and urea, and as a general purpose fuel.

16. The process as claimed in claim 1, wherein the slag producing material is limestone.

* * * * *